United States Patent [19]

Nishikawa et al.

[11] Patent Number: 4,511,877
[45] Date of Patent: Apr. 16, 1985

[54] STRAIN GAUGE WITH REDUCED CREEP PHENOMENON BY IMPROVED INSULATION LAYERING

[75] Inventors: Hisashi Nishikawa; Satoshi Suzuki; Masanobu Hirata, all of Shizuoka; Koichiro Sakamoto; Ikuo Fujisawa, both of Mishima; Shozo Takeno, Yokohama, all of Japan

[73] Assignee: Tokyo Electric Co., Ltd., Tokyo, Japan

[21] Appl. No.: 465,344

[22] Filed: Feb. 9, 1983

[30] Foreign Application Priority Data

Feb. 18, 1982 [JP] Japan .................................. 57-24939

[51] Int. Cl.³ .......................... G01L 1/22; G01B 7/18; G01G 3/14
[52] U.S. Cl. ...................................... 338/2; 338/308; 73/862.65; 73/766
[58] Field of Search ........................................ 338/2–6, 338/306–308; 73/766, 776, 862.65

[56] References Cited

U.S. PATENT DOCUMENTS

| 4,050,976 | 9/1977 | Reiters ................................. 338/2 X |
| 4,309,687 | 1/1982 | Utner et al. ............................ 338/2 |
| 4,322,707 | 3/1982 | Ort ........................................ 338/2 |
| 4,432,247 | 2/1984 | Takeno et al. ...................... 338/2 X |

FOREIGN PATENT DOCUMENTS

| 689756 | 6/1964 | Canada .................................. 338/2 |
| 1648788 | 7/1971 | Fed. Rep. of Germany . |
| 2728916 | 1/1979 | Fed. Rep. of Germany .......... 338/6 |
| 2916427 | 10/1980 | Fed. Rep. of Germany . |

Primary Examiner—Roy N. Envall, Jr.
Assistant Examiner—C. N. Sears
Attorney, Agent, or Firm—Frishauf, Holtz, Goodman & Woodward

[57] ABSTRACT

A strain sensor includes an insulating resin, e.g. polyimide resin, film formed on a beam body having a strain generating section and a wiring layer having a resistance material, e.g. nickel-chrome, layer formed on the polyimide resin film and a gold layer selectively formed on the nickel-chrome layer. A solid powder, e.g. silicon dioxide, is mixed with the polyimide resin film.

17 Claims, 17 Drawing Figures

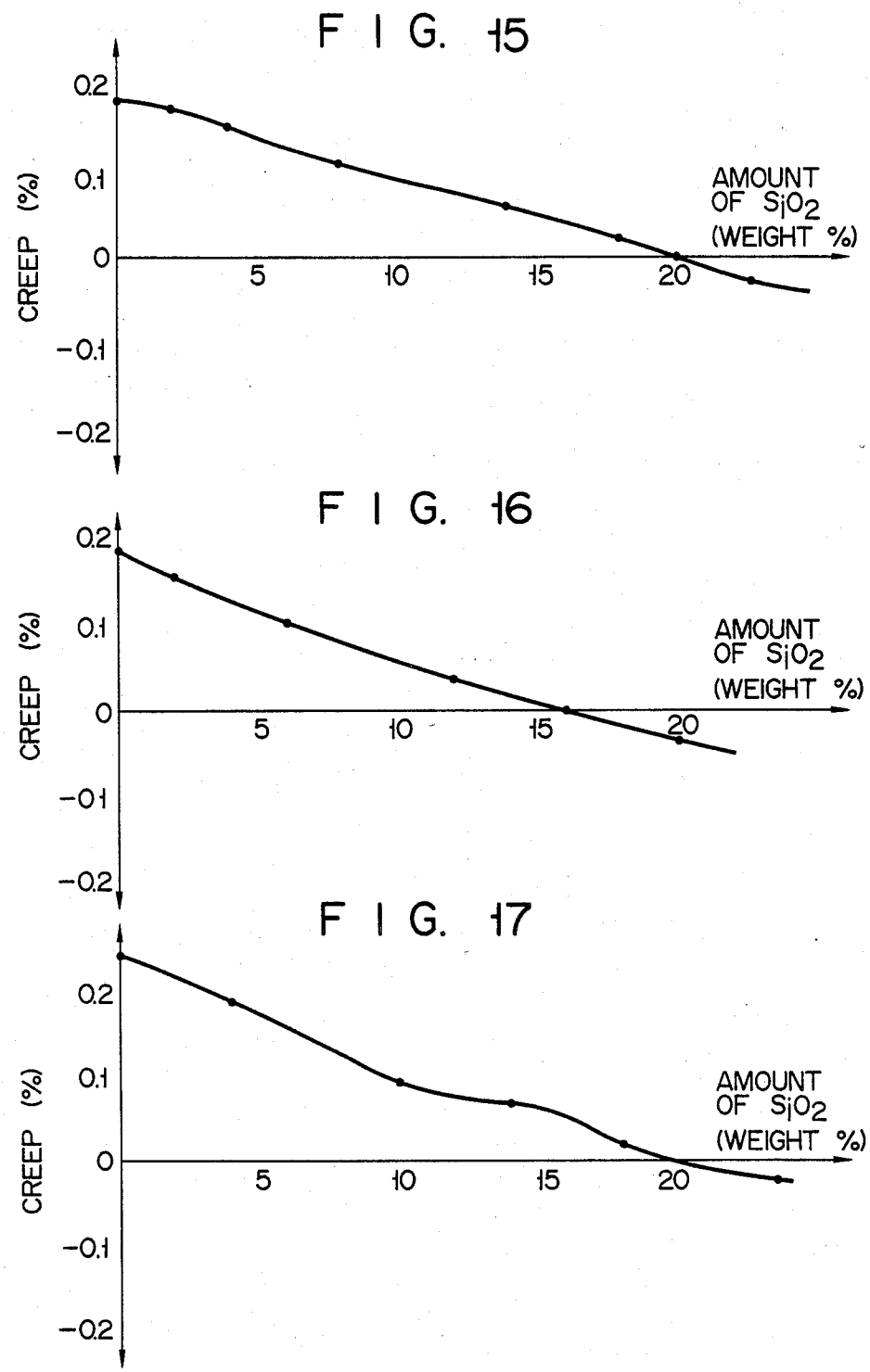

STRAIN GAUGE WITH REDUCED CREEP PHENOMENON BY IMPROVED INSULATION LAYERING

BACKGROUND OF THE INVENTION

The present invention relates to a strain sensor adapted for a load cell weighing instrument or the like.

A conventional load cell weighing instrument has a beam body including a strain generating section, an insulating film formed of an inorganic oxide such as a silicon dioxide (SiO$_2$), an aluminum trioxide (Al$_2$O$_3$) or a tantalum pentaoxide (Ta$_2$O$_5$) formed on the beam body, and thin film resistors formed to construct a strain gauge bridge circuit on the insulating film. When a load is, for example, applied to one end of the beam body, a strain is produced at the strain generating section, and this strain is transmitted to the thin film resistors through the insulating film. The resistances of the thin film resistors are varied in accordance with the magnitude of the strain, with the result that an output voltage from the bridge circuit will alter. If a predetermined load remains applied to the beam body, the output voltage of the bridge circuit will vary with time, and a so-called "creep phenomenon" will occur. The creep phenomenon is influenced by the quality of the material, the thickness, and the pattern of the thin film resistor, the quality of the material and the shape of the beam body, the quality of the material of the insulating film, and so forth.

FIG. 1 shows the creep characteristic of a conventional load cell which is constructed by forming a polyimide resin film of approx. 4 μm thickness on the beam body made of a stainless steel (SUS630), and forming thin film resistors of approx. 1000 Å thickness. When a rated load is applied to this load cell at a time t0, a rated output voltage V0 substantially corresponding to this load is almost instantaneously produced from this load cell. However, the output voltage of this load cell gradually increases. The output voltage of this load cell, for example, becomes (V0+ΔV0) at a time t1 after 10 minutes. When the load is removed from the load cell at this time t1, the output voltage of the load cell will instantaneously drop to ΔV1 having a value substantially equal to ΔV0. Thereafter, the output voltage of this load cell will gradually drop and will substantially return to 0V at a time t2 after approx. 10 minutes has elapsed.

FIG. 2 shows the creep characteristic of another conventional load cell which employs a silicon dioxide film (SiO$_2$) of 3 μm thickness instead of the polyimide resin film of 4 μm. In this case, the output voltage of this load cell drops to (V0−ΔV2) 10 minutes after the rated load is applied to the load cell. When this load is removed from the load cell, the output voltage from this load cell drops from (V0−ΔV2) to −ΔV3, and is then gradually raised to 0V.

It is assumed that the input voltage VI of a load cell having the creep characteristic shown in FIG. 1 is 10,000 mV, the gauging factor K of the thin film resistors of this load cell is 1.8, and the strain E of the thin film resistors when a predetermined load is applied to this load cell (=ΔL/L, where L represents the effective length of the thin film resistor, and ΔL represents the variation of the effective length of the thin film resistor when the load is applied to the load cell) is 0.001. In this case, the output voltage V0 of this load cell is given by the following equation:

$$V0 = VI \times K \times E = 10 \times 10^3 \times 1.8 \times 0.001 = 18 \text{ (mV)}$$

In this case, the actually measured value of the variation ΔV0 of the output voltage of the creep phenomenon was 20 μV. Accordingly the creep becomes $$\Delta V0/V0 \times 100 = 20 \times 10^{-3}/18 \times 100 = 0.11 \text{ (\%)}$$

The accuracy of the load cell having a creep of 0.11 % is approx. 1/1000. When the influence of the temperature change is considered, an inaccurate load cell is the obvious result.

The creep of the load cell having the creep characteristic shown in FIG. 2 was:

$$-\Delta V2/V0 \times 100 = \text{approx. } -0.2\%$$

Even in this case, the accuracy of the load cell becomes lower than 1/1000, and again, an inaccurate load cell is provided.

It has been heretofore considered that, in order to suppress the creep phenomena shown in FIGS. 1 and 2, the shape of a thin film resistor R formed on an insulating resin film as shown, for example, by the shaded part in FIG. 3 is altered. In other words, the creep characteristic can be adjusted by varying the ratio of the effective length L of this thin film resistor R to the width l of the sides of the thin film resistor R in FIG. 3. For instance, it is known that in order to smoothen the curve of the creep characteristic shown in FIG. 1 the size of the resistor R is so determined as to reduce the ratio l/L and in order to smoothen the curve of the creep characteristic shown in FIG. 2 that the size of the resistor R is so determined as to increase the ratio l/L. However, according to this method, the creep cannot be reduced to substantially 0, that is, to such an extent that the influence of the creeping phenomenon is negligible, and it is almost impossible to obtain a load cell of very high accuracy.

SUMMARY OF THE INVENTION

It is an object of the present invention to provide a strain sensor which is as little affected by the influence of a creep phenomenon as possible.

According to one aspect of the present invention, there is provided a strain sensor which comprises an insulating resin film mixed with solid powder and formed on the surface of a beam body having a strain generating section, and a resistance layer formed on the insulating resin film.

Since the solid powder is mixed in the insulating resin film in this invention, creep can be reduced to substantially 0, and a highly accurate strain sensor can be provided.

BRIEF DESCRIPTION OF THE DRAWINGS

FIGS. 14 through 17 are characteristic diagrams showing the relationship between the creep of a load cell having the resistance pattern shown in FIG. 13 and the weight percentage of the solid powder mixed in the insulating resin film.

DETAILED DESCRIPTION OF THE PREFERRED EMBODIMENTS

The present invention will now be described in more detail with reference to the accompanying drawings.

Figure 1:
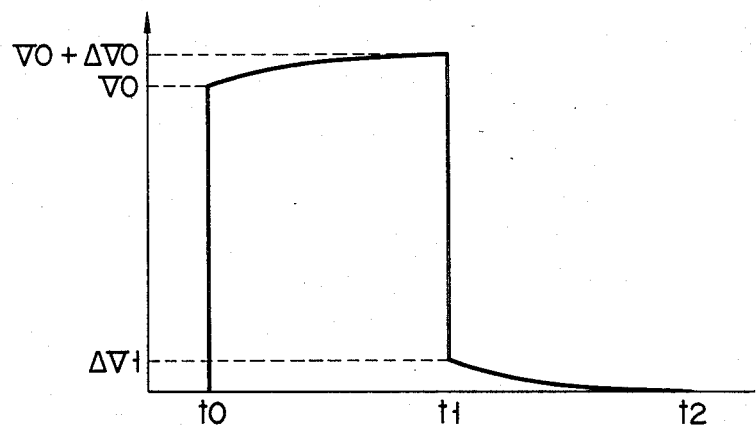
FIGS. 1 and 2 are diagrams of the creep characteristics of conventional load cells.
Figure 2:
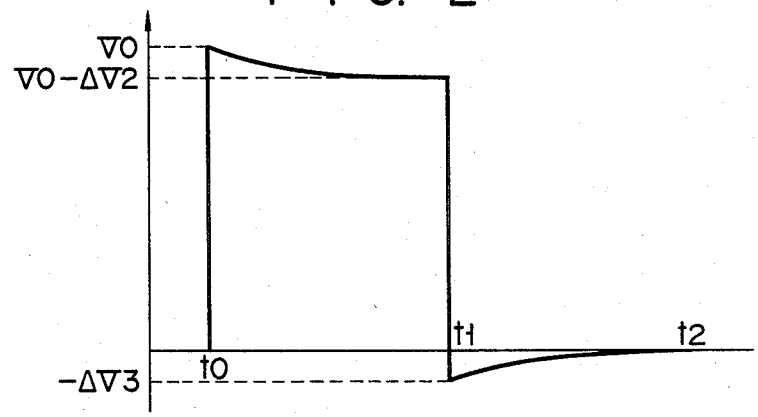
Figure 3:
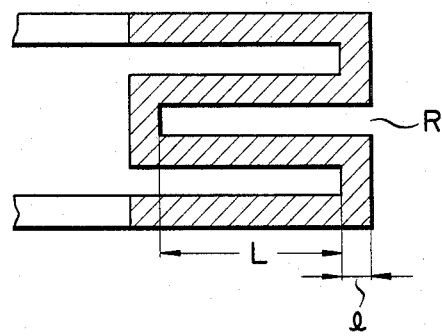
FIG. 3 is a pattern diagram of a resistance layer for the purpose of explaining techniques of improving the creep characteristics of conventional load cell.
Figure 4:
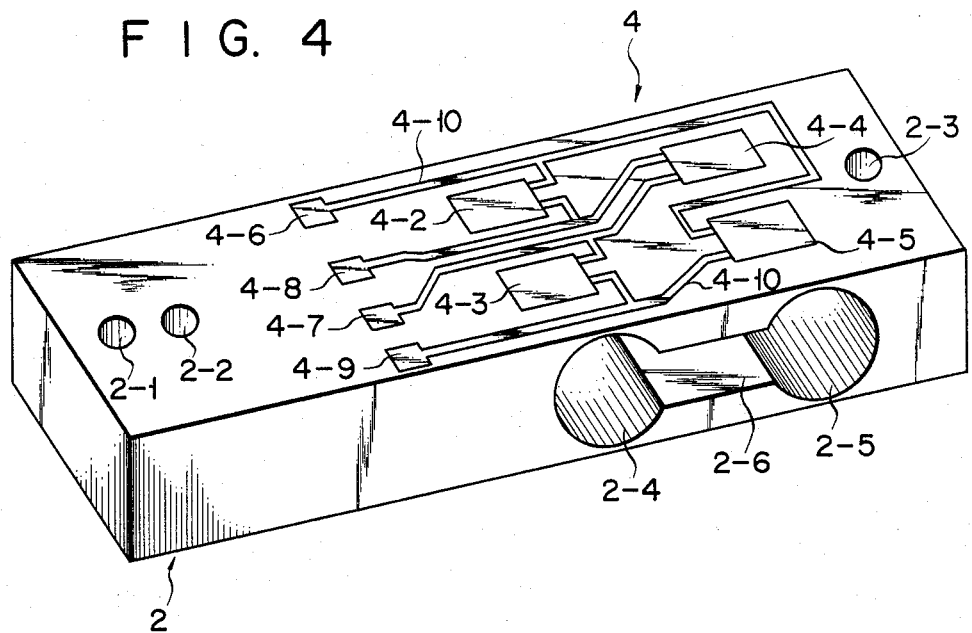
FIGS. 4 and 5 are perspective and side views of a load cell formed by employing a strain sensor according to an embodiment of the present invention.
Figure 5:
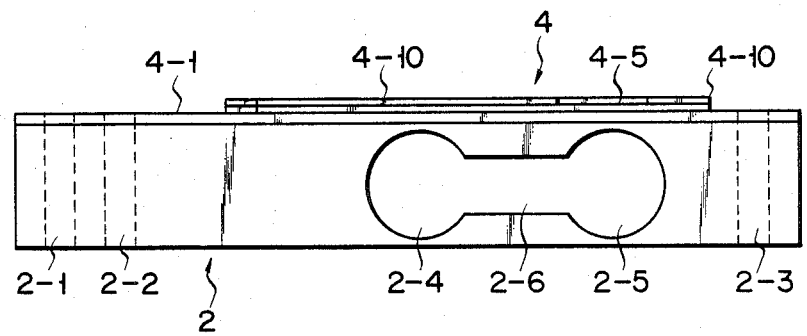

FIGS. 4 and 5 show perspective and side views of a load cell which is constructed with a strain sensor according to an embodiment of the present invention. This load cell has a beam body 2 which is obtained by cutting a stainless steel (SUS630) or duralumin (A2014, A2024 or A2218), and a load cell element or a strain sensor 4 formed on the beam body 2. This beam body 2 has two through holes 2-1 and 2-2 formed to receive clamping bolts at a stationary end, and a through hole 2-3 formed to receive a supporting clamp (not shown) for supporting a weighing tray at a movable end. Further, this beam body 2 has two lateral through holes 2-4 and 2-5 formed to extend laterally, and a coupling hole 2-6 for coupling the holes 2-4 and 2-5. Those portions of the beam body 2 corresponding to the top portions of the holes 2-4 and 2-5 form a strain generating section.

Figure 6:
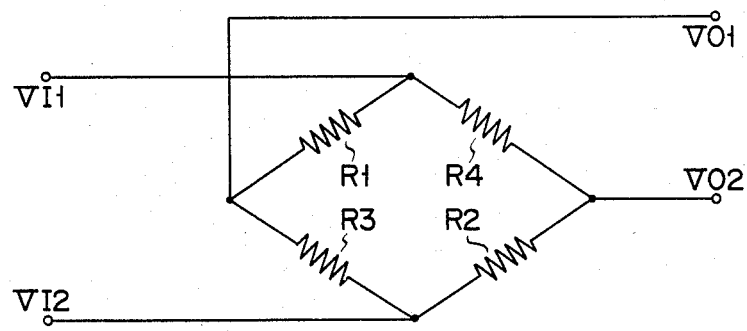
FIG. 6 is an equivalent circuit diagram of the load cell shown in FIGS. 4 and 5.

The strain sensor 4 has a polyimide resin film 4-1 formed on the beam body 2 and having powder of silicon dioxide ($SiO_2$) mixed therein, four resistance elements 4-2 to 4-5 formed on the film 4-1 at a position corresponding to the strain generating section of the beam body 2, input terminals 4-6 and 4-7, output terminals 4-8 and 4-9, and conductive layers 4-10 which construct a strain gauge bridge circuit having an equivalent circuit shown in FIG. 6 by selectively coupling the four resistance elements 4-2 to 4-5, and the input and output terminals 4-6 to 4-9. In the equivalent circuit shown in FIG. 6, resistors R1 to R4 correspond to the resistance elements 4-2 to 4-6, respectively, input terminals VI1 and VI2 respectively correspond to the input terminals 4-6 and 4-7, and output terminals V01 and V02 respectively correspond to the output terminals 4-8 and 4-9.

A method for manufacturing the load cell shown in FIGS. 4 and 5 will now be described.

A fine powder of the $SiO_2$ having, for example a mean particle diameter of 15 m$\mu$m namely nanometer (nm) is first mixed with the varnish of the polyimide resin, is then uniformly diffused in the polyimide resin varnish, and a polyimide varnish having 1000 cP of a viscosity is thus prepared. Then, the surface of the beam body 2 which is obtained by cutting a stainless steel plate (SUS630) is degreased and cleaned, the polyimide varnish containing the $SiO_2$ powder having a viscosity of 1000 cP is then dropped on the cleaned surface of the beam body 2, and the beam body 2 is rotated by a spinner at a rotating speed of 1500 r.p.m., thereby making the thickness of the polyimide varnish film uniform. Subsequently, the beam body 2 is heated at 350° C. for approx. 1 hour to evaporate the solvent of the polyimide varnish, the polyimide resin is cured, and a polyimide resin film mixed with the fine powder of $SiO_2$ and having a thickness of approx. 4 $\mu$m is formed on the beam body 2. In the case where the beam body 2 is formed of duralumin, the above-mentioned heat treatment is effected under a temperature of 200° C. instead of 350° C.

Figure 7:
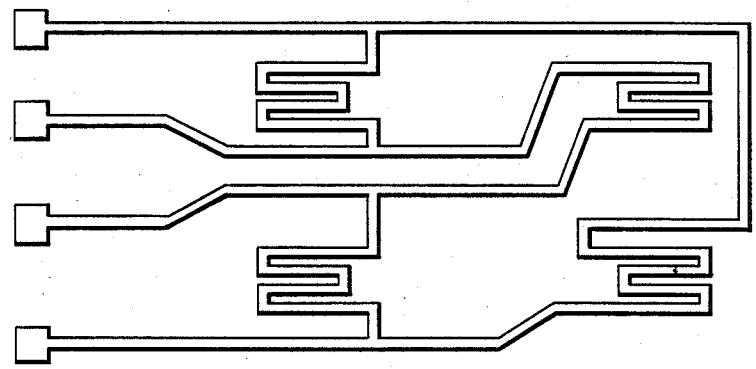
FIGS. 7 and 8 are explanatory diagrams of the step of forming a wiring pattern of the load cell shown in FIGS. 4 and 5.
Figure 8:
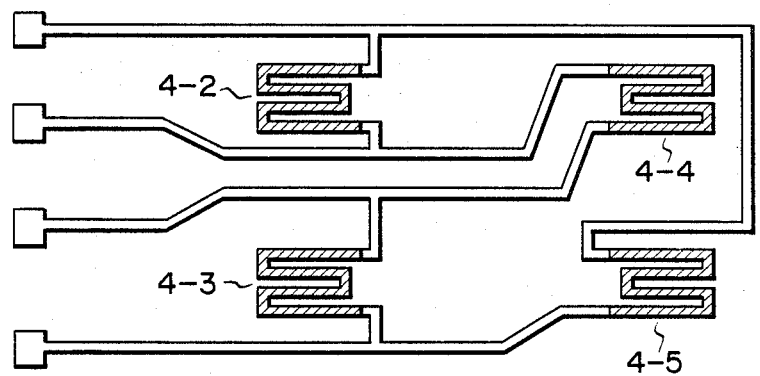

Then, a resistance layer of nickel-chrome [containing by weight percentage 50 % of nickel (Ni) and 50 % of chromium (Cr)] of 1000 Å thickness is formed by sputtering on this polyimide resin film, and a gold (Au) layer having a thickness of 2 $\mu$m is formed by sputtering on the resistance layer. A laminate of this resistance layer and the gold layer is selectively etched out by a photo-etching process to form a lamination of a predetermined pattern as shown in FIG. 7. Subsequently, the gold layer is selectively removed by etching, and selected portions of the resistance layer are exposed as shown by shaded parts in FIG. 8, thereby forming resistance elements 4-2 to 4-5.

In order to check the relationship between the creep of the load cell and the weight percentage of the $SiO_2$ powder contained in the polyimide resin film, a plurality of load cell groups each including five load cells each of which was constructed in such a manner as described above, were prepared. The load cells in the same load cell group had the polyimide resin films mixed with the $SiO_2$ powder by the same weight percentage, and the $SiO_2$ powder is mixed in the polyimide resin film of each load cell of one load cell group by a weight percentage different from that by which the $SiO_2$ powder is mixed in the polyimide resin film of each load cell of another load cell group. In this case, the ratio (l/L) of the resistance elements 4-2 to 4-5 of each load cell was set to 1/20.

The rated output voltages of these load cells were measured at a time of application of the rated load and at a time 10 min. after this rated load application time. Thus, five creep measurements were obtained for the same weight percentage of the $SiO_2$ powder.

Figure 9:
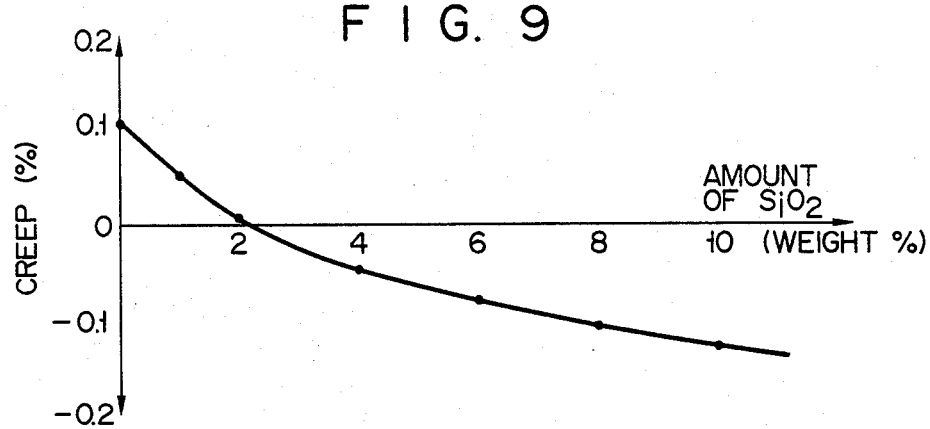
FIGS. 9 through 12 are characteristic diagrams showing the relationship between the creep of a load cell having the resistance pattern shown in FIG. 8 and the weight percentage of the solid powder mixed in the insulating resin film.

FIG. 9 shows the relationship between the creep (mean value) of the same type load cell and the weight percentage of the $SiO_2$ powder.

As understood from FIG. 9, as the weight percentage of the $SiO_2$ powder is increased, the creep gradually decreases, and the creep becomes substantially 0 when the weight percentage becomes around 2.3%. When the weight percentage is further increased, the creep becomes negative. In other words, it is possible to set the creep to zero by selecting the weight percentage of the $SiO_2$ powder to an adequate value.

Figure 10:
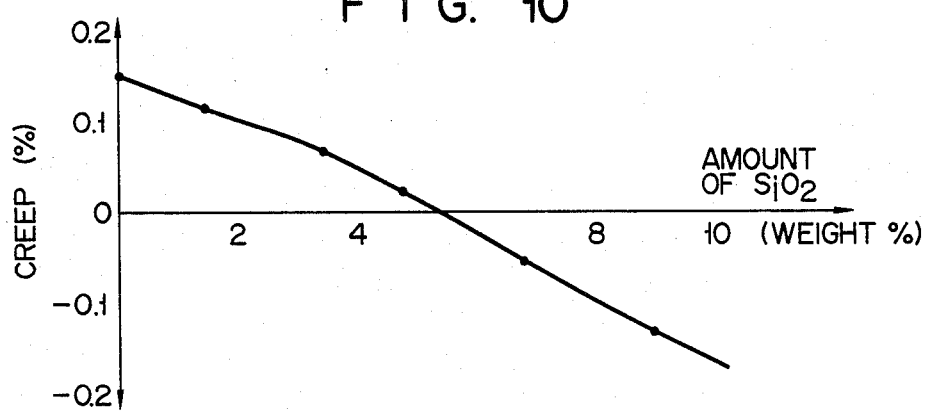

FIG. 10 shows the relationship between the weight percentage of the $SiO_2$ powder and the creep (mean value) of each load cell in which the film thicknesses of the resistance elements 4-2 to 4-5 are changed to 6000 Å. Even in this case, as the weight percentage of the $SiO_2$ powder is increased, the creep decreases, and the creep becomes 0 when the weight percentage becomes approx. 5.3%. In other words, a load cell in which the creep becomes substantially zero can be obtained when the $SiO_2$ powder is mixed in the polyimide resin to an extent greater than the amount of the example in FIG. 9.

Figure 11:
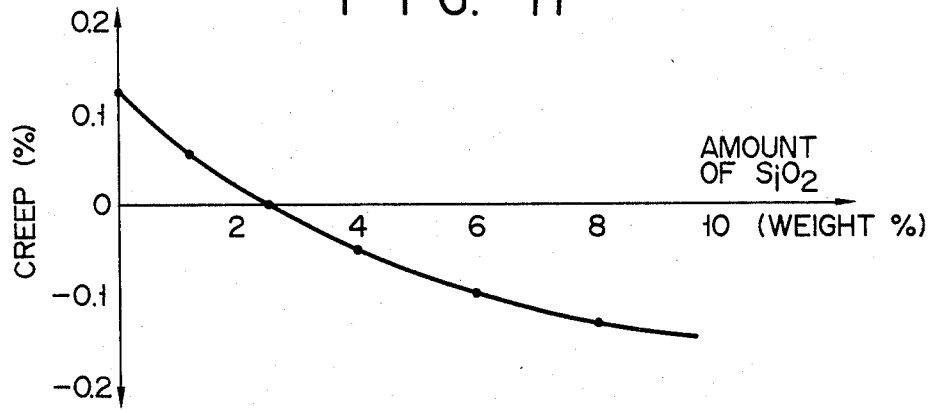

FIG. 11 shows the relationship bet.ween the creep (mean value) of each load cell in which a resistance layer having a thickness of 1000 Å is formed of nickel-chrome-silicon (containing 70% of Ni, 20% of Cr and 10% of Si by weight percentage) instead of the nickel-chrome and the weight percentage of the $SiO_2$ powder. Also in this case, as the weight percentage of the $SiO_2$ is increased, the creep decreases, and the creep becomes 0 when the weight percentage becomes approx. 2.5%.

Figure 12:
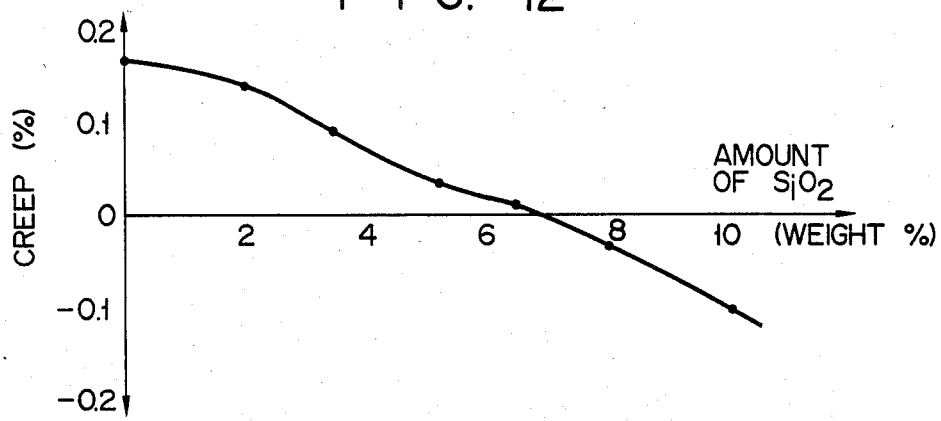

FIG. 12 shows the relationship between the weight percentage of the $SiO_2$ powder and the creep (mean value) of each load cell in which a resistance layer having a thickness of 6000 Å is formed of nickel-chrome-silicon instead of the nickel-chrome. In this example, the creep becomes 0 when the weight percentage of the $SiO_2$ powder becomes around 6.8%.

As evident from the results of the experiments shown in FIGS. 9 to 12, the tendency for the creep of the load cell to gradually become smaller as the rate of mixing the $SiO_2$ powder with the polyimide resin is increased can be obtained even if the quality and the thickness of the material of the resistance layer which forms the resistance elements 4-2 to 4-5 are varied.

Figure 13:
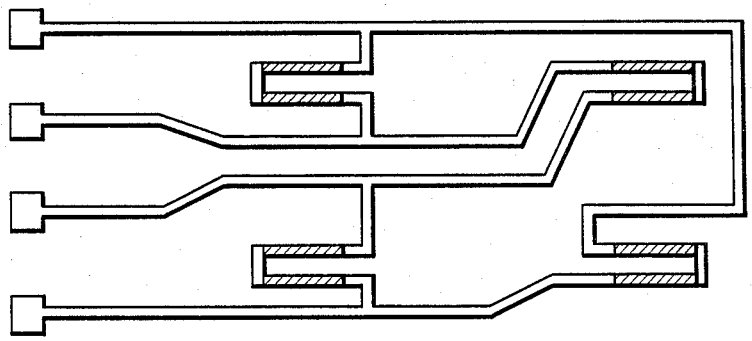
FIG. 13 is a resistance pattern different from the resistance pattern shown in FIG. 8.
Figure 14:
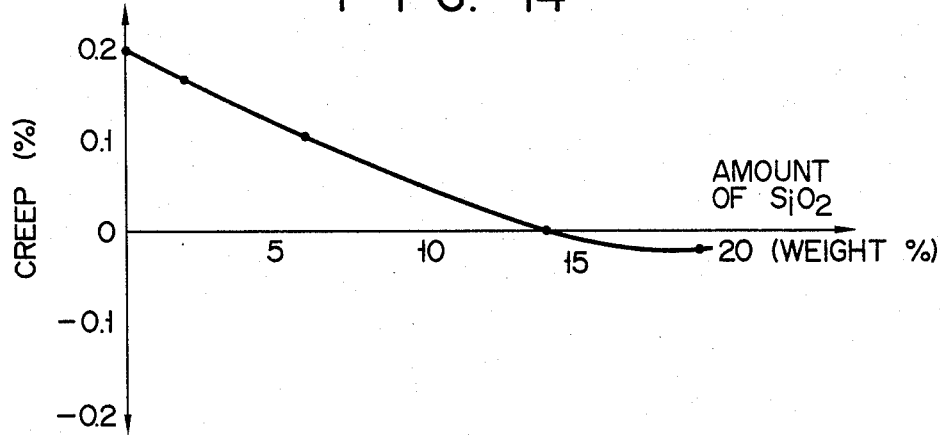

A case where the resistance elements 4-2 to 4-5 shown in FIG. 4 are formed in a simple configuration, as shown by the shaded parts in FIG. 13, will now be described.

FIGS. 14 to 17 each show the relationship between the weight percentage of the $SiO_2$ powder in the polyimide resin and the creep (mean values) of each of the respective load cells in which the polyimide resin films 4-1 are formed with a thickness of 4 $\mu$m and the resistance layers are respectively formed of nickel-chrome of 1000 Å thickness, nickel-chrome of 6000 Å, nickel-chrome-silicon of 1000 Å and nickel-chrome-silicon of 6000 Å.

As apparent from the creep-weight percentage characteristics shown in FIGS. 14 to 17, in order to set the creep to zero, it is required that the $SiO_2$ powder should be mixed with the polyimide resin at a weight percentage larger than that of the examples shown in FIGS. 9 to 12. In other words, the creep becomes substantially zero when 15%, 20%, 15% and 20% of the $SiO_2$ powders are respectively mixed with the polyimide resin in the examples shown in FIGS. 14 to 17.

In the embodiments described above, the creep of the load cell can be suppressed to substantially zero by suitably selecting the weight percentage of the $SiO_2$ powder mixed with the polyimide resin film.

The foregoing description is directed to the embodiments of the present invention, but the present invention is not limited to only the particular embodiments described above. Various other changes and modifications may be made within the spirit and scope of the present invention. For example, in the embodiments described above, the $SiO_2$ powder is used as the solid powder to be mixed with the insulating resin film 4-1. However, it is possible to employ substances which are not chemically reacted with the insulating resin film, for example, powders of aluminum trioxide ($Al_2O_3$), magnesium oxide (MgO), titanium dioxide ($TiO_2$), boron nitride (BN), or molybdenum sulfide ($MoS_2$) instead of the $SiO_2$ powder. Further, these solid substances may be used in a mixture. In addition, it is also possible to mix a conductive powder such as carbon to such an extent that the insulating property of the insulating resin film will not be lost.

Furthermore, in the embodiments described above, the polyimide resin is employed as the insulating resin. However, it is possible to employ another insulating resin if it exhibits a preferable adhesion to the resistance layer which forms the beam body 2 and the resistance elements 4-2 to 4-5. However, since the insulating resin film 4-1 is slightly heated when the resistance layer is formed by sputtering or depositing process, it is necessary to incorporate a certain degree of heat resistance, for example, at least higher than 100° C. Insulating resins which can satisfy such conditions include, in addition to the polyimide resin, cyclic polybutadiene resin, epoxy resin, and epoxy modified polyimide resin. It is further preferred that the insulating resin film be formed to a thickness greater than 1 $\mu$m so as to obtain preferable insulating properties between the resistance layer and the beam body, and that the resin film be formed to a thickness less than 20 $\mu$m so as to form the film uniformly on the beam body.

In the embodiments described above, the mean particle diameter of the $SiO_2$ powder is set to 15 m$\mu$m. However, it is possible to employ a solid powder having mean particle diameters of 7 nm to 40 nm such as is commonly sold as a thickening material for ordinary paint.

What we claim is:

1. A strain sensor comprising:
   a beam body having a strain generating section;
   an insulating resin film mixed with solid powder which includes silicon dioxide on said beam body at least over said strain generating section; and
   a resistance layer on at least a portion of said insulating resin film.

2. The strain sensor according to claim 2, wherein said solid powder further includes at least one material selected from the group consisting of aluminum trioxide, magnesium oxide, titanium dioxide, boron nitride and molybdenum sulfide.

3. The strain sensor according to claim 2, wherein said insulating resin film is formed of polyimide resin.

4. The strain sensor according to claim 2, wherein said solid powder is mixed at 2 to 20% by weight percentage with said insulating resin film.

5. The Strain Sensor according to claim 1 wherein said insulating resin film exhibits heat resistance to at least 100° C.

6. The strain sensor according to claim 1, wherein said insulating resin film is formed of a material selected from the group consisting of cyclic polybutadiene resin, epoxy resin and epoxy modified resin.

7. The strain sensor according to claim 1, wherein the mean particle diameter of said solid powder is 7 nm to 40 nm.

8. The strain sensor according to claim 1, wherein said solid powder is mixed at 2 to 20% by weight percentage with said insulating resin film.

9. A strain sensor comprising:
   a beam body having a strain generating section;
   an insulating resin film mixed with said solid powder having a means particle diameter of 7 nm to 40 nm on said beam body at least over said strain generating section; and
   a resistance layer on at least a portion of said insulating resin film.

10. The strain sensor according to claim 9, wherein said insulating resin film is formed of polyimide resin.

11. The strain sensor according to claim 9, wherein said insulating resin film exhibits heat resistance to at least 100° C.

12. The strain sensor according to claim 9, wherein said insulating resin film is formed of a material selected from the group consisting of cyclic polybutadiene resin, epoxy resin and epoxy modified resin.

13. The strain sensor according to claim 9, wherein the mean particle diameter of said solid powder is 7 nm to 40 nm.

14. A strain sensor comprising:

a beam body having a strain generating section;

an insulating resin film mixed with solid powder on said beam body at least over said strain generating section, said solid powder being 2 to 20% by weight of said insulating resin film; and a resistance layer on at least a portion of said insulating resin film.

15. The strain sensor according to claim 14, wherein said insulating resin film is formed of polyimide resin.

16. The strain sensor according to claim 14, wherein said insulating resin film exhibits heat resistance to at least 100° C.

17. The strain sensor according to claim 14, wherein said insulating resin film is formed of a material selected from the group consisting of cyclic polybutadiene resin, epoxy resin and epoxy modified resin.

* * * * *

UNITED STATES PATENT AND TRADEMARK OFFICE
CERTIFICATE OF CORRECTION

PATENT NO. : 4,511,877

DATED : April 16, 1985

INVENTOR(S) : Hisashi NISHIKAWA, et al

It is certified that error appears in the above-identified patent and that said Letters Patent is hereby corrected as shown below:

COLUMN 6 (claim 3), change "claim 2" to --claim 1--;

COLUMN 6 (claim 4), change "claim 2" to --claim 1--.

Signed and Sealed this

Eleventh Day of February 1986

[SEAL]

*Attest:*

DONALD J. QUIGG

*Attesting Officer*     *Commissioner of Patents and Trademarks*